(12) United States Patent
Jaffe

(10) Patent No.: US 7,191,636 B2
(45) Date of Patent: Mar. 20, 2007

(54) INERTIAL MEASUREMENT SYSTEM AND METHOD WITH SENSOR BIAS CANCELLATION

(75) Inventor: Randall Jaffe, Benicia, CA (US)

(73) Assignee: BEI Technologies, Inc., San Francisco, CA (US)

( * ) Notice: Subject to any disclaimer, the term of this patent is extended or adjusted under 35 U.S.C. 154(b) by 150 days.

(21) Appl. No.: 11/072,064

(22) Filed: Mar. 4, 2005

(65) Prior Publication Data

US 2006/0196269 A1    Sep. 7, 2006

(51) Int. Cl.
*G01C 25/00*    (2006.01)
*G01C 19/00*    (2006.01)

(52) U.S. Cl. ..................... 73/1.77; 73/504.02
(58) Field of Classification Search .............. 73/1.77
See application file for complete search history.

(56) References Cited

U.S. PATENT DOCUMENTS

| 2,995,934 | A | * | 8/1961 | Harvey et al. ................. 73/462 |
| 3,619,906 | A | | 11/1971 | Yates et al. |
| 3,736,791 | A | * | 6/1973 | Cantwell et al. .............. 73/1.77 |
| 3,757,093 | A | * | 9/1973 | Licata ........................... 701/4 |
| 4,399,694 | A | * | 8/1983 | Mayer ....................... 73/178 R |
| 5,194,872 | A | * | 3/1993 | Musoff et al. .............. 342/358 |
| 5,438,410 | A | | 8/1995 | Killpatrick et al. |
| 2002/0174720 | A1 | * | 11/2002 | Cardarelli ................. 73/504.02 |

* cited by examiner

Primary Examiner—Hezron Williams
Assistant Examiner—John C Hanley
(74) Attorney, Agent, or Firm—Edward S. Wright

(57) ABSTRACT

Inertial measurement system and method in which a base is rotated about an input axis in accordance with a rotation to be measured, rotation about the input axis is sensed with one or more angular rate sensors, fixed bias offset is cancelled by dithering the sensors about an axis perpendicular to their sensing axes to vary the orientation of the sensing axes relative to the base in an oscillatory manner, and signals from the sensors are demodulated at the dithering frequency.

20 Claims, 5 Drawing Sheets

INERTIAL MEASUREMENT SYSTEM AND METHOD WITH SENSOR BIAS CANCELLATION

BACKGROUND OF THE INVENTION

1. Field of Invention

This invention pertains generally to inertial measurement, and, more particularly, to an inertial measurement system and method in which the fixed bias offset of rate sensors or gyroscopes is cancelled.

2. Related Art

Angular rate sensors or gyroscopes, commonly known as gyros, are susceptible to fixed offsets or biases which are a significant source of error in inertial measurements. The magnitude of these fixed offset errors depends upon the type of sensor or gyroscope used. In applications with stringent limits on offset errors, more expensive sensors with very low residual offset errors must generally be used, and those sensors are often relatively large and heavy.

Heretofore, offset errors have been eliminated by the application of a constant rotation. For example, horizontal inertial instruments such as gyroscopes and accelerometers have been rotated continuously in carousel fashion about a vertical axis. However, it is not always feasible or even desirable to apply a constant rotation.

With ring laser gyros, errors caused by a well known frequency lock-in effect are minimized by dithering the sensors about the input axis. However, rotating a sensor about its input axis is undesirable because it provides an angular rate input other than the one to be detected.

In inertial systems of the prior art it is also necessary to rely on complex models to predict variation in offsets over time and due to factors such as temperature. These models can be quite useful in some applications, but it is often necessary to cancel offsets to a higher level of precision than the models can provide.

OBJECTS AND SUMMARY OF THE INVENTION

It is in general an object of the invention to provide a new and improved system and method for inertial measurement in which fixed bias offset is cancelled.

Another object of the invention is to provide a system and method of the above character which overcome the limitations and disadvantages of the prior art.

These and other objects are achieved in accordance with the invention by providing an inertial measurement system and method in which a base is rotated about an input axis in accordance with a rotation to be measured, rotation about the input axis is sensed with one or more angular rate sensors, fixed bias offset is cancelled by dithering the sensors about an axis perpendicular to their sensing axes to vary the orientation of the sensing axes relative to the base in an oscillatory manner, and signals from the sensors are demodulated at the dithering frequency.

DETAILED DESCRIPTION

Figure 1:
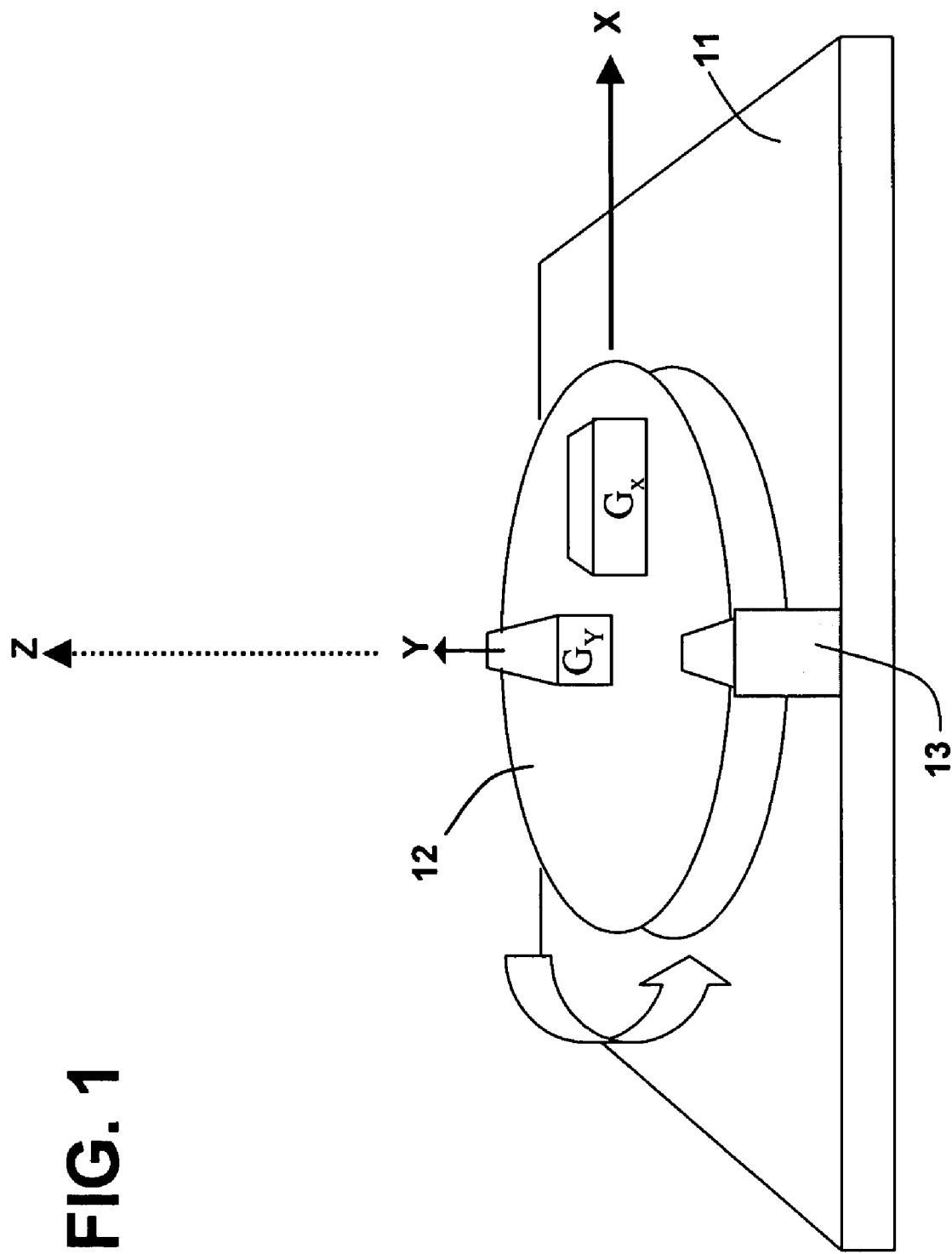
FIG. 1 is a schematic perspective view of one embodiment of a rate sensor system according to the invention.

As illustrated in FIG. 1, the system includes a mounting base 11 and two angular rate sensors or gyroscopes $G_x$ and $G_y$ which are mounted on a modulator 12 on the base, with the input axes of the sensors nominally aligned with the x and y axes of the base. The modulator rotates the sensors about the z-axis which is perpendicular to input axes of the sensors and to the base.

The rotation is oscillatory or dithering in nature, with a frequency on the order of a few Hertz to several hundred Hertz and an amplitude on the order of several milliradians to several degrees. A sensor 13 monitors the position of the modulator and provides a signal corresponding to the instantaneous angular displacement of the modulator and the rate sensors. As discussed more fully hereinafter, that signal allows the system to demodulate or remove the effect of the modulation in connection with the processing of the gyro output signals.

The modulator can be of suitable known design, including oscillating mechanical flexures or springs, piezoelectric actuators, motors, or MEMS-based structures. The amplitude of the modulation should be large enough to provide adequate resolution of the gyro output signals, and the frequency should be higher than the rotation to be measured. In addition, the modulator must provide stable motion in the plane of the sensor axes. The motion can be of any suitable type, including a simple periodic waveform such as a sine wave or a square wave, or a more complex motion.

Modulation sensor 13 can also be of conventional design such as a coil and magnet, an optical sensor, or an encoder.

The rotation of the modulator causes the input axes of the rate sensors or gyros to rotate with respect to the fixed axes of the base, and the difference in alignment between sensor axes and the axes of the base at any given time is equal to the instantaneous angular position of the modulator. Unlike prior art devices which rotate the sensor about the input axis and thereby apply an angular rate input to the sensor, the modulator rotates the input axes themselves, and there is no spurious rate input. The orientation of the input axes is varied in a dithering manner with a relatively rapid, oscillatory motion, and in the absence of other externally applied angular inputs, the rotation of the sensor axes does not produce a rotation rate signal.

Figure 2:
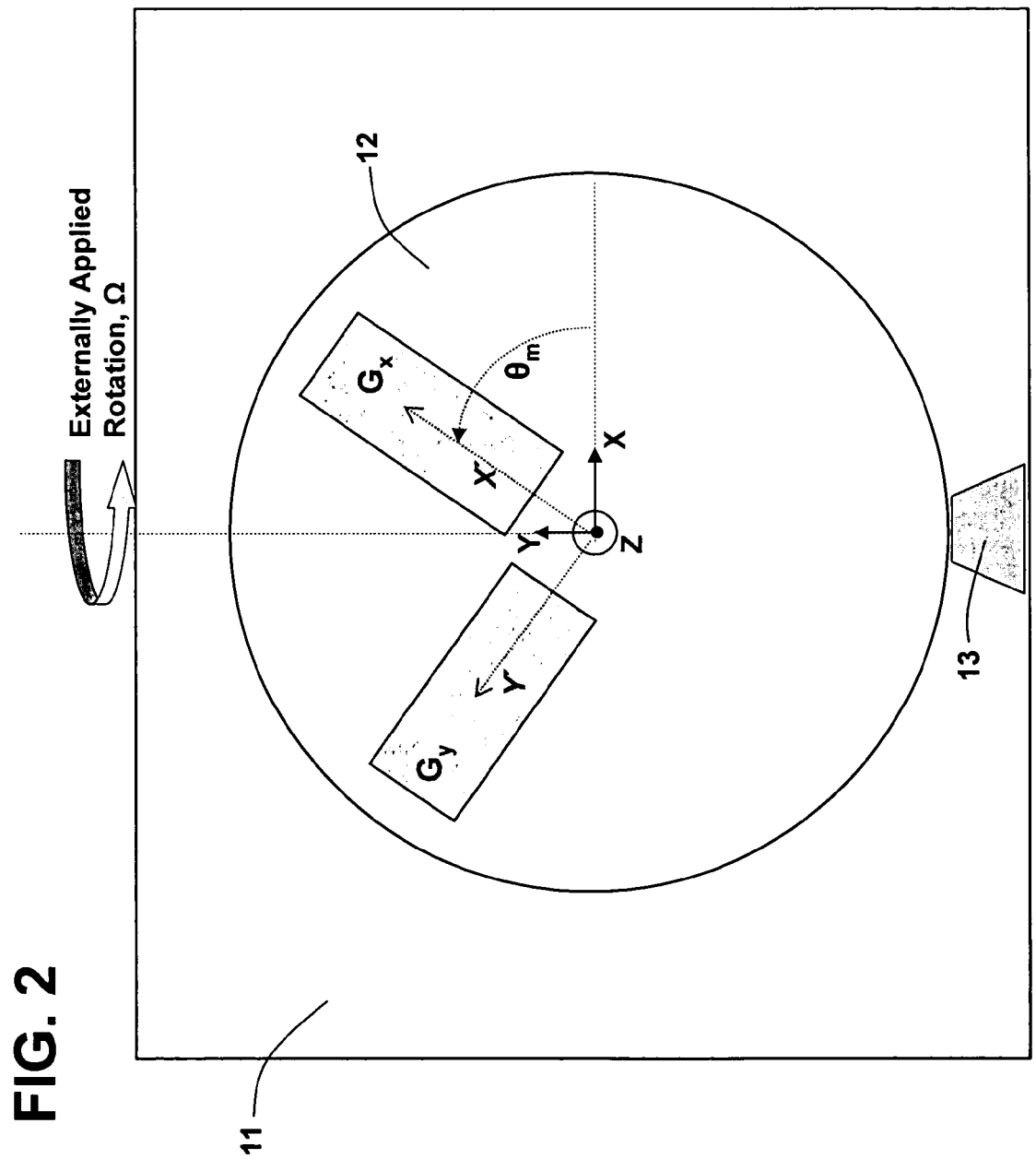
FIG. 2 is a top plan view of the embodiment of FIG. 1.

In FIG. 2, the input axes x', y' of the rate sensors or gyros are shown as being rotated by an angle $\theta_m$ with respect to the fixed reference axes x, y of the base. The z-axis is perpendicular to the plane of the figure, and an external rate of rotation $\Omega$ is applied to the entire system, including the base, about the y-axis.

The modulator oscillates about the z-axis with an amplitude which is typically on the order of 2–50 milliradians and a frequency on the order of 20–500 Hz, with higher frequencies of oscillation typically being associated with smaller amplitudes of oscillation. Sensor 13 detects the instantaneous value of $\theta_m$ and provides a signal which is used in processing the output signals from the gyros. That signal allows the system to compensate for the time-varying input axes of rate sensors $G_x$ and $G_y$ as well as being used in demodulating the gyro outputs.

The rate sensors or gyros should have a suitable bandwidth for measurements at the frequency of the input axis modulation, and they should also have low enough noise in the frequency range near the modulation frequency to permit the gyro modulation signals to be adequately resolved.

Prior to demodulation, the output of each rate sensor or gyro consists of a combination of the sensor fixed offset and the externally applied angular rate. Since the modulation affects the applied angular rate, but not the fixed offset, the system is able to distinguish between them.

With the two signals being affected differently by the modulation of the input axis, relatively simple signal processing can be used to separate the two signals, producing a gyro output that is substantially free from the typical effects of gyro offset error or bias. The signal from the modulation sensor which corresponds to the instantaneous orientation of the axes is used in conjunction with an input axis demodulator in the processing circuit to remove the effect of the mechanical modulation.

The time-varying modulation angle $\theta_m$ can be written as the sum of a constant angle $\theta_0$ and a modulation amplitude m which varies, e.g. sinusoidally, in time t at an angular frequency $\omega$. Thus, $\theta_m = \theta_0 + m \sin(\omega t)$. The output signal $S_x$ of gyro $G_x$ due to externally applied rotation $\Omega$ is given by:

$$S_x = \Omega \sin(\theta_m) = \Omega \sin[\theta_0 + m \sin(\omega t)].$$

Using the trigonometric identity for the sine of a sum of angles, keeping second-order and lower terms of m and adding a bias offset $B_x$, the relationship becomes:

$$S_x = \Omega[\sin(\theta_0)(1-(\tfrac{1}{2})m^2 \sin^2(\omega t)) + \cos(\theta_0) m \sin(\omega t)] + B_x.$$

The fixed offset $B_x$ is not modulated, and if a synchronous demodulation is performed on $S_x$ at frequency $f=\omega/2\pi$, only a term proportional to $\Omega\, m \cos(\theta_0)$ remains. Since the value of m is known from the modulator pickoff signal, the value of $\Omega \cos(\theta_0)$, which is the component of the externally applied rotation along the input axis of gyro $G_x$ is determined. If the magnitude of the externally applied rotation $\Omega$ is also known, the orientation angle $\theta_0$ is also determined. The fixed bias offset $B_x$ is washed out or cancelled in regard to these calculations, both for the component of rotation along the x'-axis and the angle of orientation relative to the applied rotation.

A similar analysis applies to gyro $G_y$ and output signal $S_y$. The component of externally applied rotation is also computed for $G_y$, and if the value of this applied rotation is known, the orientation angle of $G_y$ relative to the input rotation can be determined. The fixed bias $B_y$ of gyro $G_y$ is also cancelled by this method in the same manner as the fixed bias for gyro $G_x$.

With the demodulated outputs from the two gyros, the values of both the applied rotation $\Omega$ and the orientation angle $\theta_0$ can be determined. If the demodulated output signals of the two gyros are designated $S_{xd}$ and $S_{yd}$, then since $S_{xd} \propto \Omega \cos(\theta_0)$, and $S_{yd} \propto -\Omega \sin(\theta_0)$, $$S_{xd}^2 + S_{yd}^2 \propto \Omega^2, \text{ and}$$

$$S_{yd}/S_{xd} \propto -\tan(\theta 0).$$

Although in FIG. 2 the external rotation is shown as being applied about the y-axis, this method is valid for any applied rotation about an axis in the plane of the modulator or for the in-plane component of rotation about an axis outside the plane. The angle $\theta_0$ is then interpreted as the angle from the axis of the applied rotation to the input axis of gyro $G_y$, or as the complement of the angle from the rotation axis to the input axis of gyro $G_x$.

Figure 3:
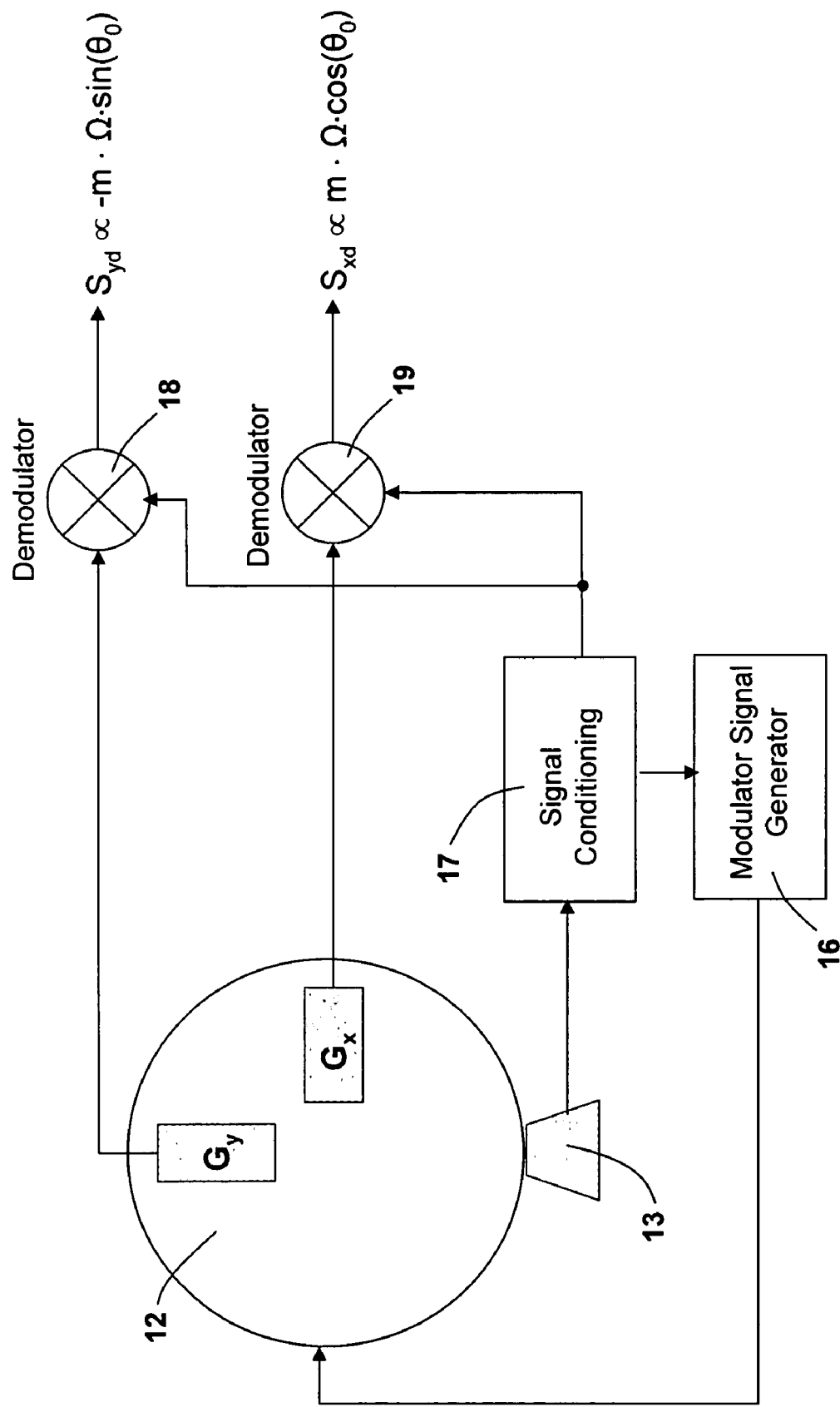
FIG. 3 is a block diagram of a system for processing signals from the sensors in the embodiment of FIG. 1.

As shown in FIG. 3, modulator 12 is driven by a signal generator 16 which includes an automatic gain control (AGC) circuit. The output of modulation sensor 13 is processed in a conditioning circuit 17, and the conditioning circuit provides a feedback signal to the AGC circuit in the signal generator to maintain the amplitude of the modulation at a constant level. As in FIG. 2, the externally applied rotation $\Omega$ is about an axis in the plane of the input axes of the two gyros.

The outputs of the two gyros are applied to the inputs of a pair of demodulators 18, 19, and the output of signal conditioning circuit 17 is applied as a phase reference to the two demodulators. The outputs of the demodulators are the signals $S_{xd}$ and $S_{yd}$ from which the values of applied rotation $\Omega$ and the angle of orientation $\theta_0$ are determined.

Output signals $S_x$ and $S_y$ can be fed to analog signal processing circuitry (not shown) to provide an analog output signal corresponding to the applied external rotation $\Omega$, or they can be converted to digital form and processed digitally for filtering, compensation of errors, and output. Alternatively, the gyros and the signal conditioning circuit can provide digital outputs, and demodulators 18, 19 can be digital as well.

Figure 4:
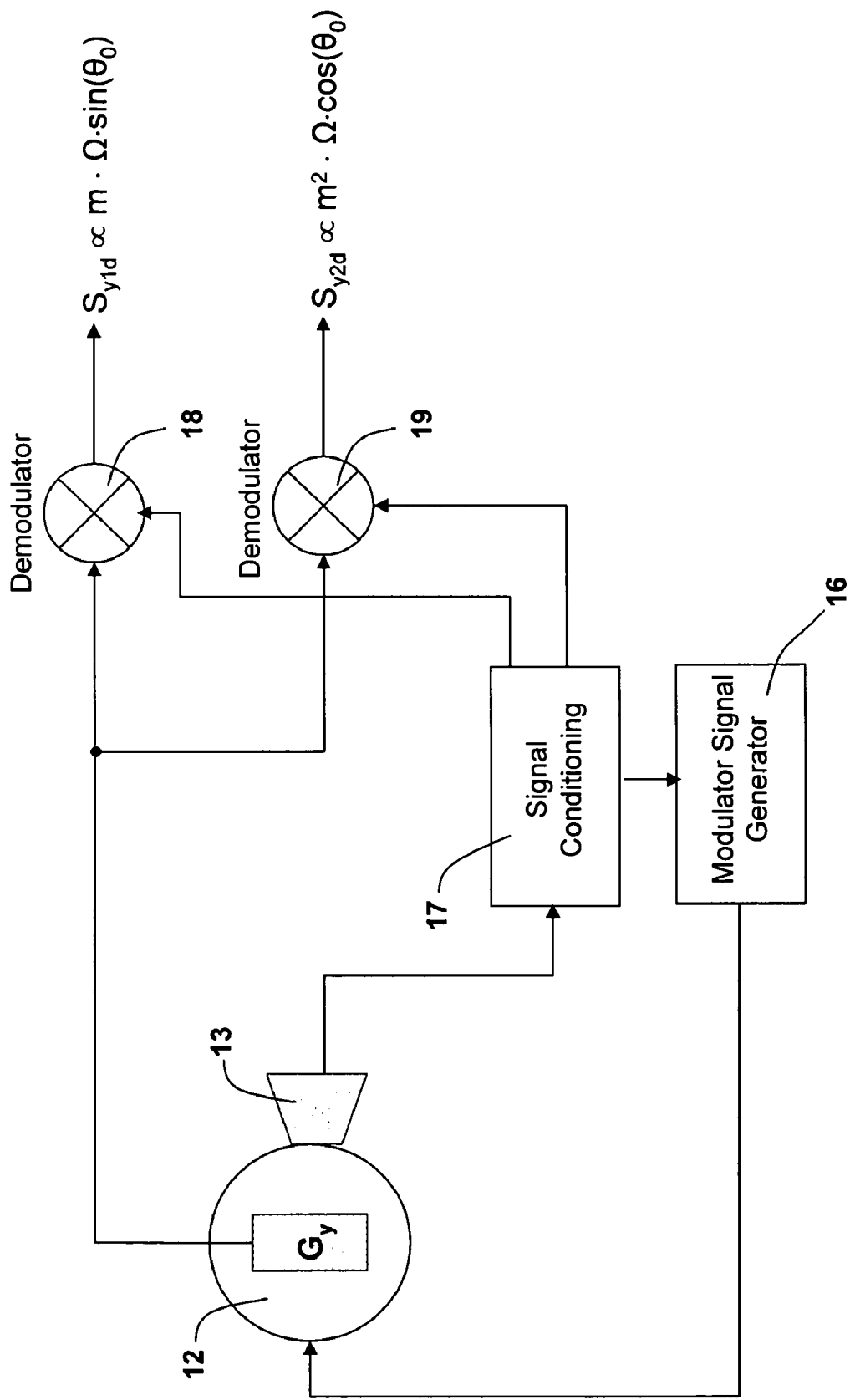
FIG. 4 is a block diagram of a system for processing signals from the sensor in another embodiment of a rate sensor system incorporating the invention.

The embodiment of FIG. 4 is similar to the embodiment of FIG. 3 except that only a single gyro $G_y$ is used, and signal processing circuit 17 provides two frequency reference outputs. One of those outputs has a frequency of $\omega/2\pi$ and is equivalent to the reference signal applied to the demodulators in the embodiment of FIG. 3. It is applied to the reference input of demodulator 18. The other reference output has frequency of $\omega/\pi$ and is applied to the reference input of demodulator 19. The output of gyro $G_y$ is applied to the signal inputs of both demodulators.

Demodulator 18 operates in the same manner as in the embodiment of FIG. 3, providing an output signal $S_{y1d}$ which is proportional to m $\Omega \sin(\theta_0)$, which is linearly proportional to the amplitude m of the modulation. Demodulator 19 operates at twice the frequency of the modulator and converts the output of gyro $G_y$ to a signal $S_{y2d}$ which is proportional to $m^2 \Omega \cos(\theta_0)$, i.e. the second order in the modulation amplitude m. The signals from the two demodulators can be used in combination to determine the values of applied rotation $\Omega$ and the angle of orientation $\theta_0$ since m is controlled by signal generator 16 and is therefore known.

If desired, the embodiment of FIG. 4 can be extended to a plurality of gyros by mounting the gyros on separate modulators and processing the output of each gyro with a processing circuit as in FIG. 4.

Figure 5:
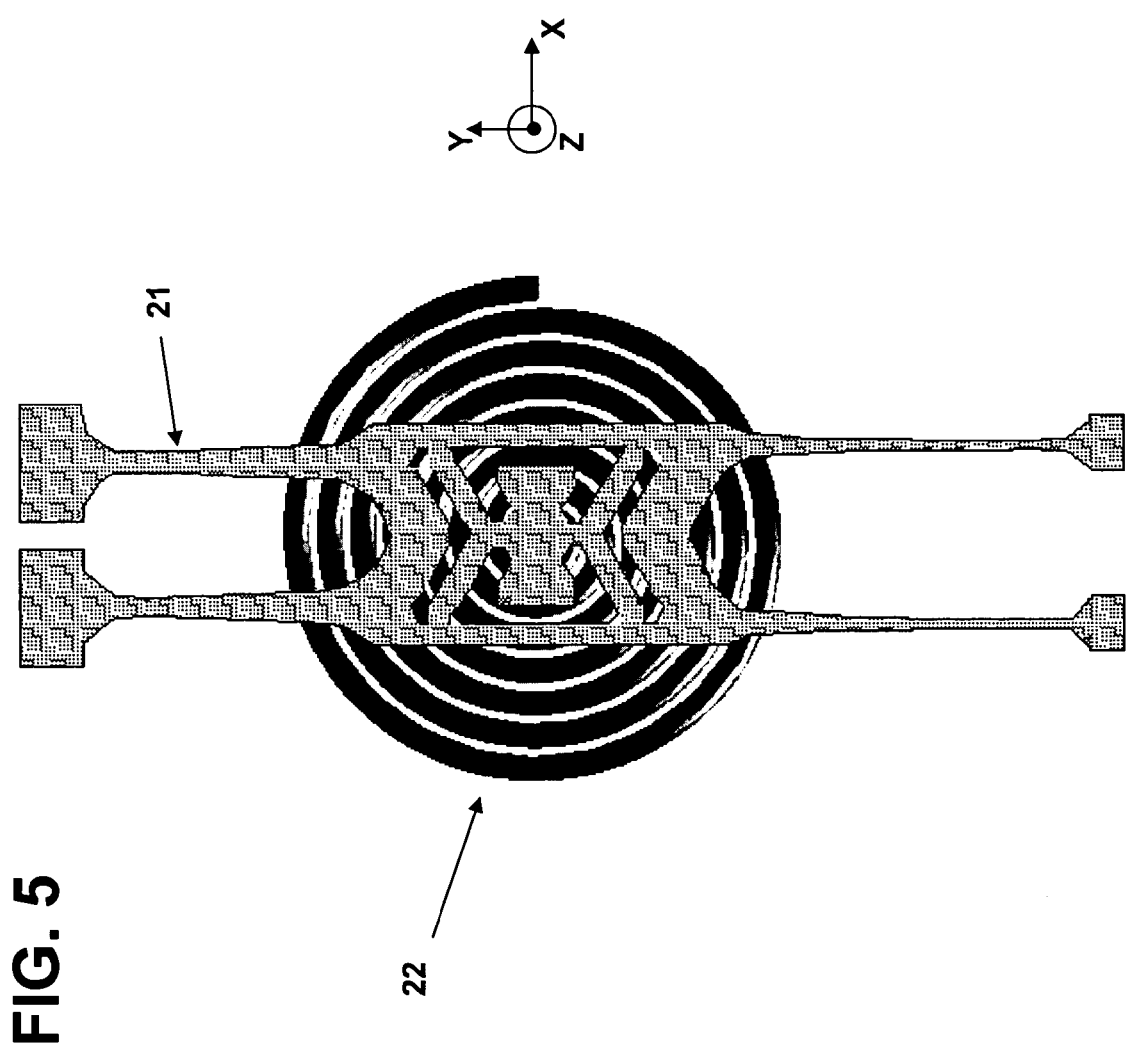
FIG. 5 is a top plan view, somewhat schematic, of another embodiment of a rate sensor system incorporating the invention.

It is also possible to incorporate a modulator into the design of the gyro itself by mounting the rate sensing element onto a mechanical flexure or the like. The gyro and the flexure are then packaged within the outline of the gyro. Thus, in the embodiment of FIG. 5, a rate sensor in the form of a quartz tuning fork 21 is mounted on a modulator in the form of a coil spring 22, with the sensitive axis of the tuning fork parallel to the y-axis and the modulator oscillating about an axis parallel to the z-axis.

The modulator can also be made an integral part of the sensor structure, which is particularly suitable for very small gyro sensing elements such as those produced from quartz or silicon wafers using micro-electromechanical (MEMS) techniques. Such devices would thus be made suitable for applications where higher accuracy is required without significant cost or increase in size.

Although the modulator has been described and illustrated as being a planar structure which rotates about an axis perpendicular to its plane, it can also be implemented in other ways as long as it produces a rotation of one or more sensor input axes that results in an oscillation of the orientation of those axes.

The invention is particularly suitable for use in gyrocompassing applications where the angular velocity of the earth is used to determine north. In such applications, the externally applied rotation is just the rotation of the earth, and determination of the angle $\theta_0$ allows the system to find north. If the system is locally level, or if the inclination of the system is known by the use of accelerometers, the latitude can also be determined from the component of the earth's rate as measured by the gyros in the horizontal plane of the locally level system. Adjustment for the effect of the modulation amplitude can be made in the calibration of the system. The invention is also useful in other inertial applications such as dynamic navigation.

The invention has a number of important features and advantages. By eliminating the effects of bias offset, it makes it possible to use less expensive rate sensors or gyros which are relatively small in size but would otherwise be precluded from use because of their relatively large bias offsets. The smaller sensors lend themselves to use with smaller modulators, which provides a compact and relatively inexpensive system with improved accuracy. Fixed bias offsets are eliminated or cancelled without producing a spurious rotation rate signal, and the system can also provide cancellation of residual errors in offset compensation models.

It is apparent from the foregoing that a new and improved inertial measurement system and method have been provided. While only certain presently preferred embodiments have been described in detail, as will be apparent to those familiar with the art, certain changes and modifications can be made without departing from the scope of the invention as defined by the following claims.

The invention claimed is:

1. An inertial measurement method comprising the steps of: rotating a base about an input axis in accordance with a rotation to be measured, sensing rotation about the input axis with an angular rate sensor having a sensing axis, dithering the sensor about an axis perpendicular to the sensing axis to vary the orientation of the sensing axis relative to the base in an oscillatory manner at a modulation frequency, and demodulating signals from the sensor at the modulation frequency.

2. The method of claim 1 wherein the modulation frequency is on the order of a few Hertz to hundreds of Hertz, and the amplitude of the dithering is on the order of several milliradians to several degrees.

3. The method of claim 1 wherein the modulation frequency is on the order of 20–500 Hz, and the amplitude of the dithering is on the order of 2–50 milliradians.

4. The method of claim 1 including the step of demodulating signals from the sensor at twice the modulation frequency.

5. An inertial measurement method comprising the steps of: rotating a base about an input axis in accordance with a rotation to be measured, sensing rotation about the input axis with a pair of angular rate sensors having a sensing axes in a common plane, dithering the sensor about an axis perpendicular to the sensing axes to vary the orientation of the sensing axes relative to the base in an oscillatory manner at a modulation frequency, and demodulating signals from the sensors at the modulation frequency.

6. The method of claim 5 wherein the sensing axes are perpendicular to each other.

7. The method of claim 5 wherein one of the sensing axes is dithered about the input axis.

8. The method of claim 5 wherein the modulation frequency is on the order of a few Hertz to hundreds of Hertz, and the amplitude of the dithering is on the order of several milliradians to several degrees.

9. The method of claim 5 wherein the modulation frequency is on the order of 20–500 Hz, and the amplitude of the dithering is on the order of 2–50 milliradians.

10. An inertial measurement system, comprising a base which rotates about an input axis in accordance with a rotation to be measured, an angular rate sensor carried by the base responsive to rotation about a sensing axis, a modulator for dithering the sensor about an axis perpendicular to the sensing axis to vary the orientation of the sensing axis relative to the base in an oscillatory manner at a modulation frequency, and means for demodulating signals from the sensor at the modulation frequency.

11. The inertial measurement system of claim 1 wherein the modulator is mounted on the base and the sensor is mounted on the modulator.

12. The inertial measurement of claim 1 wherein the modulation frequency is on the order of a few Hertz to hundreds of Hertz, and the amplitude of the dithering is on the order of several milliradians to several degrees.

13. The inertial measurement system of claim 1 wherein the modulation frequency is on the order of 20–500 Hz, and the amplitude of the dithering is on the order of 2–50 milliradians.

14. The inertial measurement system of claim 1 wherein the means for demodulating signals from the sensor also includes means for demodulating signals from the sensor at twice the modulation frequency.

15. An inertial measurement system, comprising a base which rotates about an input axis in accordance with a rotation to be measured, a first angular rate sensor carried by the base responsive to rotation about a first sensing axis, a second angular rate sensor carried by the base responsive to rotation about a second sensing axis which lies in a common plane with the first sensing axis, a modulator for dithering the sensors about an axis perpendicular to the sensing axes to vary the orientation of the sensing axes relative to the base in an oscillatory manner at a modulation frequency, and means for demodulating signals from the sensors at the modulation frequency.

16. The inertial measurement system of claim 15 wherein the modulator is mounted on the base and the sensors are mounted on the modulator.

17. The inertial measurement system of claim 15 wherein the first and second sensing axes are perpendicular to each other.

18. The inertial measurement system of claim 15 wherein one of the sensing axes is dithered about the input axis.

19. The inertial measurement system of claim 15 wherein the modulation frequency is on the order of a few Hertz to hundreds of Hertz, and the amplitude of the dithering is on the order of several milliradians to several degrees.

20. The inertial measurement system of claim 15 wherein the modulation frequency is on the order of 20–500 Hz, and the amplitude of the dithering is on the order of 2–50 milliradians.

* * * * *